(12) United States Patent
Thery et al.

(10) Patent No.: US 11,732,864 B2
(45) Date of Patent: Aug. 22, 2023

(54) LIGHTING OR SIGNALING DEVICE AND MOTOR VEHICLE

(71) Applicant: VALEO VISION, Bobigny (FR)

(72) Inventors: Stephane Thery, Wuhan (CN); Jean Claude Puente, Wuhan (CN); Minli Yu, Wuhan (CN); Rong Zhou, Wuhan (CN); Lihua Zeng, Wuhan (CN); Zhao Fang, Wuhan (CN); Hongchao Dong, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/251,543

(22) PCT Filed: Jun. 4, 2019

(86) PCT No.: PCT/CN2019/089936
§ 371 (c)(1),
(2) Date: Dec. 11, 2020

(87) PCT Pub. No.: WO2019/237967
PCT Pub. Date: Dec. 19, 2019

(65) Prior Publication Data
US 2021/0254808 A1    Aug. 19, 2021

(30) Foreign Application Priority Data
Jun. 12, 2018    (CN) .......................... 201810601683.4

(51) Int. Cl.
*F21S 43/249*    (2018.01)
*F21S 41/24*    (2018.01)
*F21W 107/10*    (2018.01)

(52) U.S. Cl.
CPC ............. *F21S 43/249* (2018.01); *F21S 41/24* (2018.01); *F21W 2107/10* (2018.01)

(58) Field of Classification Search
CPC ...... F21S 43/237; F21S 43/249; F21S 43/251; F21S 41/147; F21S 41/24; F21S 41/321;
(Continued)

(56) References Cited

U.S. PATENT DOCUMENTS 7,731,400 B2   6/2010   Dubosc et al.
8,070,336 B2   12/2011   Dubosc et al.
(Continued)

FOREIGN PATENT DOCUMENTS

CN    1 881 263 A1    1/2008
CN    202147628 U    2/2012
(Continued)

OTHER PUBLICATIONS

International Search Report dated Sep. 10, 2019 in PCT/CN2019/089936 filed on Jun. 4, 2019, 5 pages

*Primary Examiner* — Zheng Song
(74) *Attorney, Agent, or Firm* — Oblon, McClelland, Maier & Neustadt, L.L.P.

(57) ABSTRACT

A lighting or signaling device comprises a first light source and a housing, the housing defining at least a first light exit region and a second light exit region independent of each other, part of light from the first light source exiting as a first light beam from the first light exit region; the lighting or signaling device further comprises a light guide member, which is assigned to the first light source and is positioned and configured to guide a part of the light from the first light source to exit through at least the second light exit region. A motor vehicle is also disclosed.

17 Claims, 5 Drawing Sheets

(58) Field of Classification Search
CPC .......... F21S 41/50; F21S 43/14; F21S 43/245;
F21S 43/247; F21S 43/31; F21S 43/40;
F21W 2107/10; F21W 2103/55; B60Q
1/0041
See application file for complete search history.

(56) References Cited

U.S. PATENT DOCUMENTS

| | | | |
|---|---|---|---|
| 8,308,326 | B2 | 11/2012 | Dubosc et al. |
| 8,939,621 | B2 | 1/2015 | Brown et al. |
| 9,651,212 | B1* | 5/2017 | Wasilewski ........... F21S 43/239 |
| 9,714,747 | B2 | 7/2017 | Tsukamoto |
| 10,018,770 | B2 | 7/2018 | Leitow et al. |
| 10,036,522 | B2* | 7/2018 | Aizawa ................. F21S 43/237 |
| 10,053,004 | B2 | 8/2018 | Brown et al. |
| 2008/0019139 | A1 | 1/2008 | Dubosc et al. |
| 2009/0027914 | A1* | 1/2009 | Wu .......................... F21S 43/14 362/555 |
| 2010/0238675 | A1 | 9/2010 | Dubosc et al. |
| 2011/0128750 | A1* | 6/2011 | Nakada .................. F21S 43/40 362/518 |
| 2011/0228549 | A1* | 9/2011 | Lindsay ................ F21S 43/237 362/555 |
| 2011/0255298 | A1* | 10/2011 | Lindsay ................ F21S 43/237 362/511 |
| 2011/0031061 | A1 | 12/2011 | Brown et al. |
| 2012/0069592 | A1* | 3/2012 | Natsume ................ F21S 43/40 362/511 |
| 2012/0075876 | A1 | 3/2012 | Dubosc et al. |
| 2012/0274462 | A1* | 11/2012 | Martinez ............... F21S 43/245 340/479 |
| 2013/0215633 | A1* | 8/2013 | Wuerthele ............ B60Q 1/0047 362/543 |
| 2014/0160778 | A1* | 6/2014 | Nakada ................. F21S 43/249 362/511 |
| 2014/0328078 | A1* | 11/2014 | Williams .............. F21S 41/645 362/512 |
| 2015/0009697 | A1* | 1/2015 | Kawamura ............. F21S 43/13 362/516 |
| 2015/0078021 | A1* | 3/2015 | Brown ..................... B60Q 1/56 362/509 |
| 2016/0040848 | A1 | 2/2016 | Tsukamoto |
| 2016/0062031 | A1 | 3/2016 | Leitow et al. |
| 2018/0210127 | A1* | 7/2018 | Akiyama .............. F21S 43/237 |
| 2019/0170317 | A1* | 6/2019 | Gloss .................... F21S 43/245 |
| 2019/0195461 | A1* | 6/2019 | Terada ................. B60Q 1/0035 |
| 2019/0242546 | A1* | 8/2019 | Sakashita ............. F21S 43/245 |
| 2019/0248278 | A1* | 8/2019 | Salter ................... F21S 43/245 |
| 2019/0283663 | A1* | 9/2019 | Ohgitani .............. F21S 43/237 |
| 2019/0285241 | A1* | 9/2019 | Ikuta ...................... F21S 43/31 |
| 2019/0285242 | A1* | 9/2019 | Horikawa ............. F21S 43/237 |
| 2019/0309919 | A1* | 10/2019 | Tanoue ................... B60Q 1/04 |
| 2019/0368679 | A1* | 12/2019 | Cho ........................ F21S 41/28 |

FOREIGN PATENT DOCUMENTS

| | | |
|---|---|---|
| CN | 102777843 A | 11/2012 |
| CN | 105189204 A | 12/2015 |
| CN | 105371204 A | 3/2016 |

* cited by examiner

LIGHTING OR SIGNALING DEVICE AND MOTOR VEHICLE

TECHNICAL FIELD

Embodiments of the present disclosure generally relate to the field of lighting and/or signaling technologies, and particularly, to a lighting or signaling device, and a motor vehicle comprising the lighting or signaling device.

DESCRIPTION OF THE RELATED ART

Various lighting and/or signaling devices are used for providing light for lighting and/or signaling and are widely applied in various fields, for example, a lighting or signaling device such as a vehicle light is used in a motor vehicle to ensure traffic safety.

Generally, the motor vehicle is often provided with various types of vehicle lights to achieve different functions. In current motor vehicles, different vehicle lights are arranged independently, for example, a high beam light, a low beam light, a daytime running light, a position light and the like all have respective optical systems and thereby occupy separate spaces respectively. As such, when a certain vehicle light (for example, a daytime running light, a position light or the like) of the motor vehicle is lit, a local region where this vehicle light is located becomes bright, among the whole vehicle light module, while other regions where other vehicle lights (for example, the high beam light, the low beam light, and the like) in off state are located are dark.

SUMMARY

An object of the present disclosure is to improve existing lighting or signaling devices so as to enable more efficient usage of light exit regions.

An embodiment according to an aspect of the present disclosure provides a lighting or signaling device, comprising a first light source and a housing, the housing defining at least a first light exit region and a second light exit region independent of each other, part of light from the first light source is guided to exit as a first light beam from the first light exit region; the lighting or signaling device further comprises a light guide member, which is assigned to the first light source and is positioned and configured to guide a part of the light from the first light source to exit through at least the second light exit region.

In some embodiments, the light guide member is positioned inside the housing such that it is invisible when being viewed from the exterior of the lighting or signaling device in a direction opposite to a light exiting direction.

In some embodiments, the lighting or signaling device further comprises a light shielding member positioned to shield the light guide member from being directly viewed from the exterior of the lighting or signaling device in the direction opposite to the light exiting direction.

In some embodiments, the lighting or signaling device further comprises a second light source, from which light is guided to exit as a second light beam, which is different from the first light beam, from the second light exit region.

In some embodiments, the lighting or signaling device further comprises a first optical element positioned and configured to guide the light from the second light source to exit from the second light exit region.

In some embodiments, the light guide member is positioned and configured to guide a part of the light from the first light source to exit directly from the second light exit region; or the light guide member is positioned and configured to guide a part of the light from the first light source to the first optical element, such that a part of the light from the first light source is guided by the first optical element to exit from the second light exit region.

In some embodiments, the second light beam includes at least one of a low light beam and a high light beam for a motor vehicle.

In some embodiments, the light guide member extends from the first light exit region to a position adjacent to the second light exit region so as to guide the light from the first light source towards the second light exit region.

In some embodiments, the first light exit region and the second light exit region are arranged adjacent to each other.

In some embodiments, the housing further defines a third light exit region configured to emit a third light beam different from the first light beam; the second light exit region and the third light exit region are arranged adjacent to each other, or the first light exit region is positioned between the second light exit region and the third light exit region. Thereby, a third light source may be provided for the third light exit region so that the third light exit region emits a third light beam. The light guide member is further configured to guide a part of the light from the first light source to exit through the third light exit region.

In some embodiments, the first light exit region comprises a first light exit sub-region and a second light exit sub-region arranged adjacent to each other.

In some embodiments, the first light source is a light source for a daytime running light or a position light of a motor vehicle. The second light source may be a high light beam source for the motor vehicle. The third light source may be a low light beam source for the motor vehicle.

An embodiment according to another aspect of the present disclosure provides a motor vehicle, comprising the lighting or signaling device described in any of embodiments of the present disclosure.

Other objects and advantages of the present disclosure will become apparent from the following description of the present disclosure taken in conjunction with the accompanying drawings, and may give a comprehensive understanding of the present disclosure.

BRIEF DESCRIPTION OF THE DRAWINGS

The above and other aspects, features and advantages of the present disclosure will become more apparent by describing in detail exemplary embodiments thereof with reference to the accompanying drawings, in which.

DETAILED DESCRIPTION OF PREFERRED EMBODIMENTS

Figure 1:
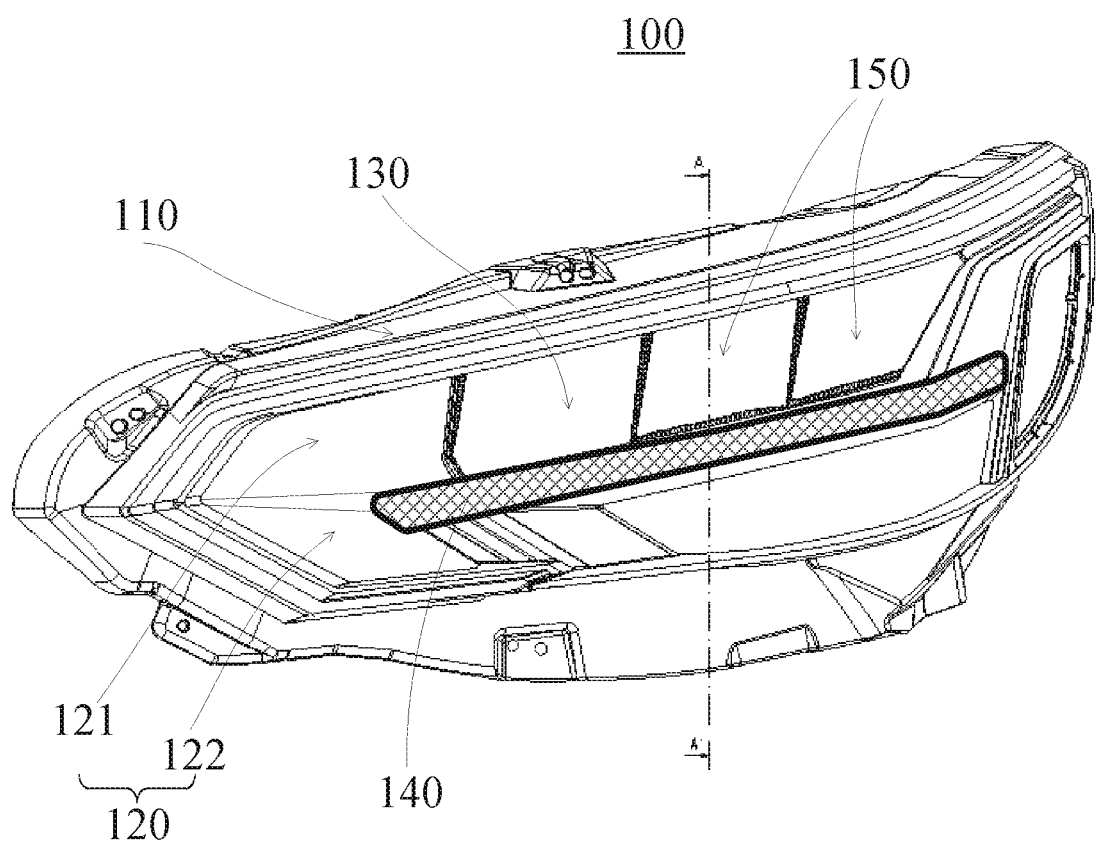
FIG. 1 is a front perspective view showing a structure of a part of a lighting or signaling device according to an exemplary embodiment of the present disclosure, where a part of a housing is removed so that a light guide member is schematically illustrated.

Exemplary embodiments of the present disclosure will be described hereinafter in detail with reference to the accompanying drawings, where the same reference numerals refer to the elements that have the same or similar functions. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
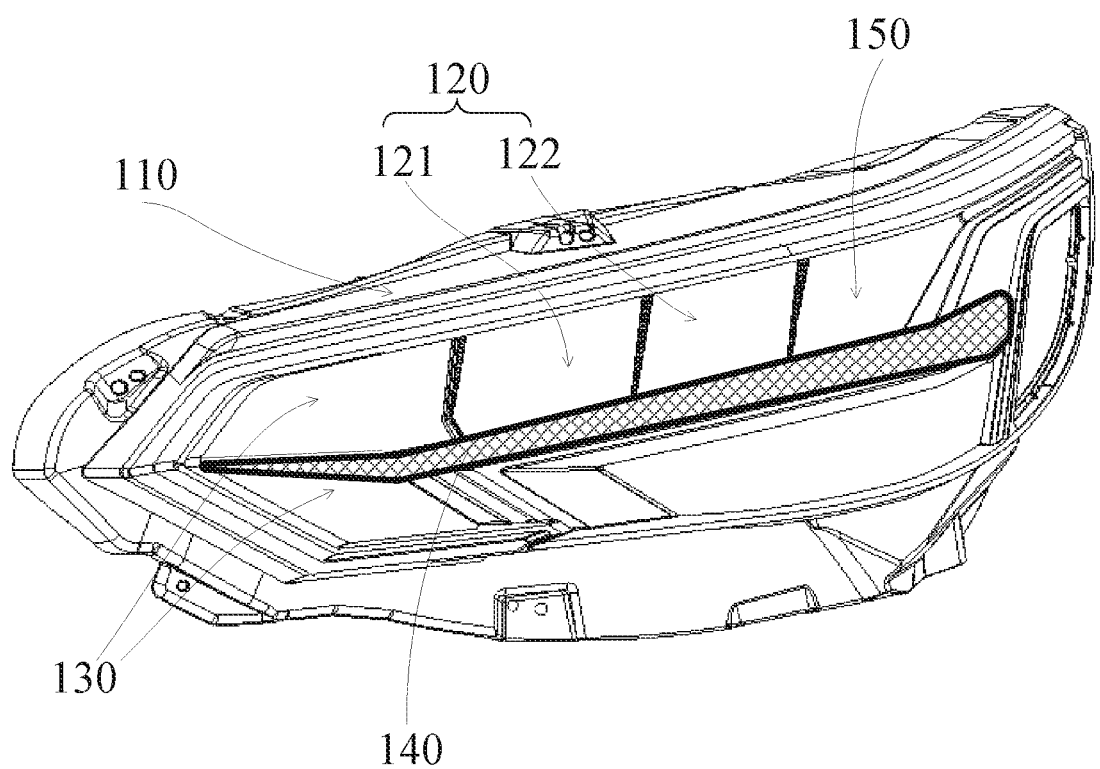
FIG. 2 is a front perspective view showing a structure of a part of a lighting or signaling device according to another exemplary embodiment of the present disclosure, where a part of a housing is removed so that a light guide member is schematically illustrated.

FIGS. 1 and 2 schematically show a structure of a part of a lighting or signaling device according to an exemplary embodiment of the present disclosure. As shown, a lighting or signaling device 100 comprises a housing 110 and a first light source 101 for generating light for lighting or signaling. The lighting or signaling device 100 has a plurality of light exit regions, and light exiting from respective light exit regions are used for corresponding lighting or signaling functions. Exemplarily, the lighting or signaling device 100 comprises at least a first light exit region 120 and a second light exit region 130 defined by the housing 110, and the first light exit region 120 and the second light exit region 130 are independent of each other or are differentiable visually from each other so as to emit light beams for corresponding lighting or signaling functions or effects respectively.

For example, a part of the light generated or emitted by the first light source 101 may exit from the first light exit region 120 and may be used, or shaped by for example an optical element, as a first light beam so as to be emitted outwards from the lighting or signaling device. In some examples, the first light source 101 is a light source for a daytime running light or a position light of a motor vehicle, or the first light beam exiting from the first light exit region 120 is a light beam exiting from the daytime running light or position light of the motor vehicle. The second light exit region 130 may emit a second light beam different from the first light beam, for example, a low light beam or high light beam.

In exemplary embodiment of the present disclosure, as shown in FIGS. 1-5, the lighting or signaling device 100 further comprises a light guide member 140, which is assigned to the first light source 101 and is positioned and configured to guide a part of the light from the first light source 101 to exit through at least the second light exit region 130. Thus, when the first light source 101 is lit, the light generated or emitted by the first light source 101 will not only exit outwardly through the first light exit region 120, but also be guided by the light guide member 140 so as to exit outwardly through the second light exit region 130, increasing light exit area.

Thereby, according to embodiments of the present disclosure, elements of existing lighting or signaling devices of a motor vehicle may be utilized more sufficiently, so that in a limited space, only an additional light guide member is simply provided such that the light from the first light source is guided to exit through more than one light exit region, that is, a part of the light from the first light source exits through the light exit region provided corresponding to the first light source, while other part of the light from the first light source exits through other light exit region, thus a larger light exit area can be obtained and a visual effect can be improved, so that the vehicle will be more easily observed by other road users (for example, vehicle drivers, pedestrians and the like), thereby further improving driving safety.

In practical applications, some vehicle lights (for example, a daytime running light, a position light and the like) and other some vehicle lights (for example, a high beam light, a low beam light and the like) will be often used separately or at different times. With the lighting or signaling device provided according to embodiments of the present disclosure, it is possible that when the high beam light or the low beam light is switched off while the daytime running light or the position light is lit, the additionally provided light guide member may be used to guide a part of the light from the daytime running light or the position light to exit from the light exit region of, for example, the high beam light or the low beam light, thereby enabling increase in light exit area.

In addition, in some conventional technologies of increasing an effective light exit area of the daytime running light or the position light, a voltage, which is supplied to the high beam light or the low beam light, is reduced so that the high beam light or the low beam light also functions partially or completely as the daytime running light or the position light. In some countries, regions or organizations, however, for example, the UNECE (the United Nations Economic Commission for Europe), China, India, Korea, etc., it is not allowed or recommended by relevant automobile laws, regulations or policies that the high beam light or the low beam light also functions partially or completely as the daytime running light or the position light by reducing the voltage supplied to the high beam light or the low beam light. With the lighting or signaling device provided according to embodiments of the present disclosure, when the high beam light or the low beam light is switched off, a part of the light from the daytime running light or the position light is guided by the light guide member to exit from a part or all of the light exit region of the high beam light or the low beam light, that is, the high beam light or low beam light, when being switched off, can also function as the daytime running light or position light, thus an increase in the effective light exit area of the daytime running light or position light can be achieved, and the lighting or signaling effect can be strengthened visually, such that the vehicle equipped with such lighting or signaling device can be more easily observed by other traffic participants (for example, a vehicle driver, a pedestrian or the like), further improving driving safety, and the increase in the light exit area of the daytime running light or position light can be achieved without reducing the voltage of the high beam light or the low beam light, enabling better satisfaction of relevant laws, regulations or policies.

In the embodiment shown in FIG. 1, the first light exit region 120 and the second light exit region 130 are arranged adjacent to each other, that is, a larger light exit area could be achieved by using an adjacent light exit region, thus it can avoid the structure and elements of the existing lighting or signaling device from being changed too much, and the element, such as the light guide member as described above, which is additionally provided for this purpose may be configured such that it has a smaller size, which is more advantageous for arranging it within the space of the existing lighting or signaling device.

It is noted that the lighting or signaling device described in the present disclosure is not limited to a single or one-piece type device or module, and alternatively, it may include a combination or collection of a plurality of light modules; for example, for an existing, separately provided vehicle light (e.g., the daytime running light, the position light, the high beam light, the low beam light, or the like), parts of light from one or more of the vehicle light may be guided by a light guide member towards the light exit region of other one or more of the vehicle lights.

As illustrated, the first light exit region 120 may comprise a first light exit sub-region 121 and a second light exit sub-region 122, which may be arranged adjacent to each other, or alternatively, may be spaced apart from each other. For example, the first light exit sub-region 121 may be a light exit region from which a light beam of one of the daytime running light and the position light exits, while the second light exit sub-region 122 may be a light exit region from which a light beam of the other of the daytime running light and the position light exits. Alternatively, it will be understood that the first light exit region may be a single one-piece light exit region for emitting for example the light beam of the daytime running light or the position light.

As shown in FIGS. 1 and 2, the housing 110 may further define a third light exit region 150 for emitting a third light beam different from the first light beam emitted from the first light exit region 120. The third light beam may be also different from the second light beam. For example, the second light beam is one of a low light beam and a high light beam, while the third light beam is the other of the low light beam and the high light beam. To this end, light sources having corresponding functions are provided for respective light exit regions.

As shown in FIG. 1, the second light exit region 130 and the third light exit region 150 are arranged adjacent to each other, and the first light exit region 120 may be positioned adjacent to the second light exit region 130 or to the third light exit region 150; for example, the first light exit region 120, the second light exit region 130 and the third light exit region 150 are arranged in this order, and the light guide member 140 extends in a direction from a position adjacent to the first light exit region 120 to a position adjacent to the second light exit region 130 and/or the third light exit region 150, so as to guide a part of the light from the first light source 101 towards the second light exit region 130 and/or the third light exit region 150.

Alternatively, as shown in FIG. 2, the first light exit region 120 may be positioned between the second light exit region 130 and the third light exit region 150, and the light guide member 140 extends in two opposite directions from positions adjacent to the first light exit region 120 to positions adjacent to the second light exit region 130 and the third light exit region 150 respectively, so as to guide a part of the light from the first light source 101 towards the second light exit region 130 and the third light exit region 150.

Although in the embodiments shown in FIGS. 1 and 2, the light guide member 140 is positioned below the second light exit region 130 and the third light exit region 150, the present disclosure is not particularly limited to this, as long as the position and configuration of the light guide member can be provided such that a part of the light from the first light source 101 is guided towards corresponding light exit region. In addition, it will be understood that structures, sizes, shapes, arrangements and positional relationship of the first light exit region, the second light exit region, the third light exit region and the light guide member may be designed and adjusted according to specific requirements of structure, size, profile, appearance and the like of the lighting or signaling device.

Figure 5:
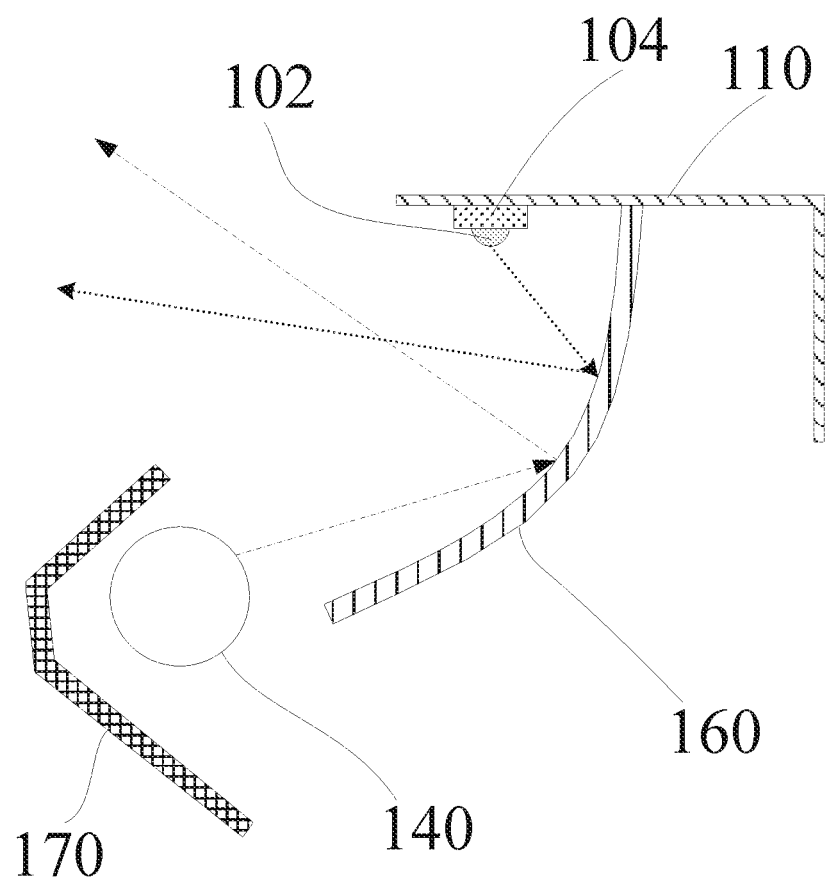
FIG. 5 is a cross sectional view schematically showing an arrangement and a light path of a lighting or signaling device according to another exemplary embodiment of the present disclosure.

In some embodiments of the present disclosure, as shown in FIG. 5, the lighting or signaling device 100 further comprises a second light source 102, and light from the second light source 102 is guided to exit as a second light beam, which is different from the first light beam, from the second light exit region 130 and/or the third light exit region 150. For example, the second light source may be a light source for the high beam light or the low beam light of the motor vehicle. Of course, other light sources may be provided as required, as long as they meet requirements of relevant laws and regulations.

Figure 3:
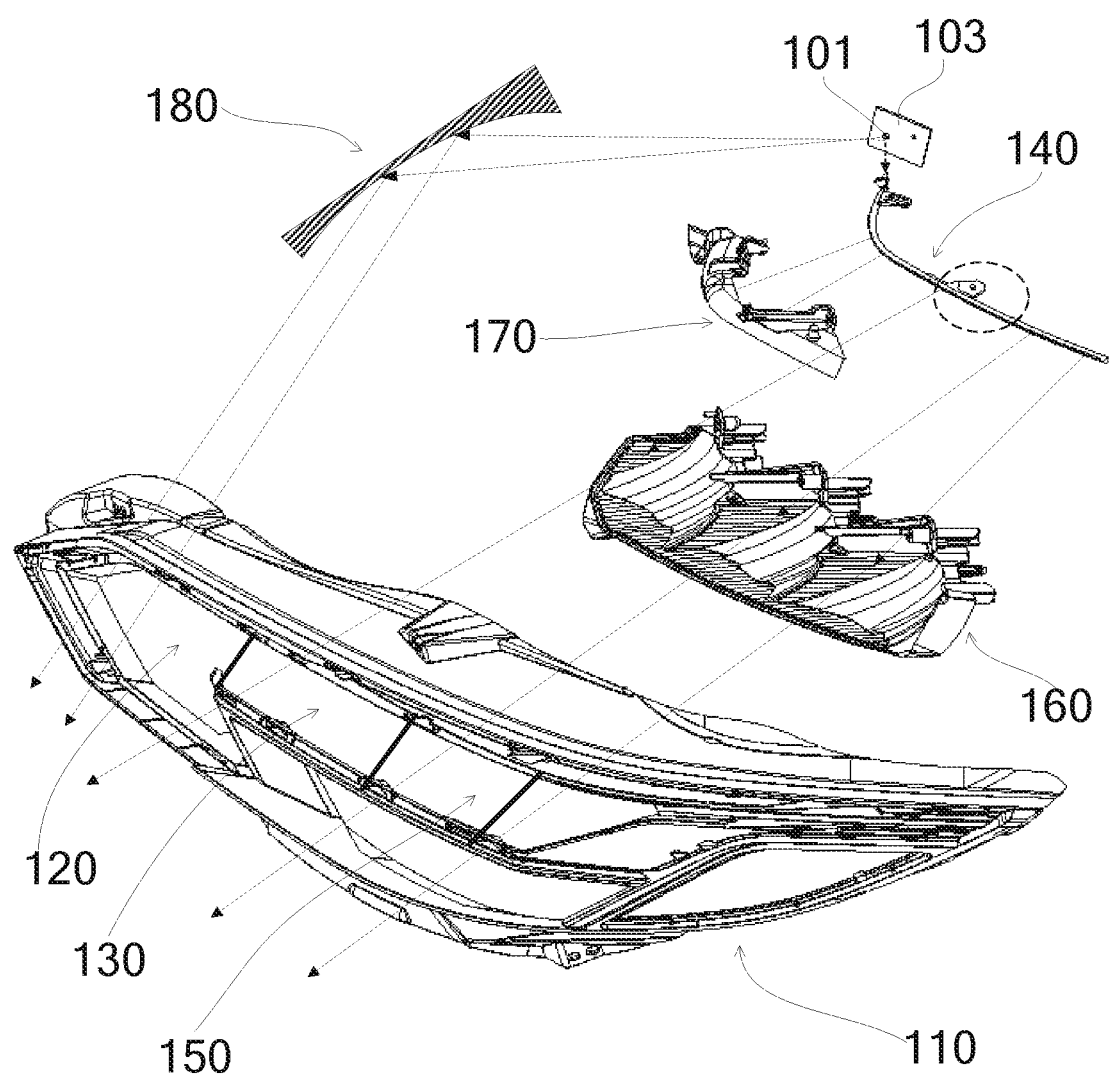
FIG. 3 is an exploded perspective view showing a structure of a part of a lighting or signaling device according to an exemplary embodiment of the present disclosure.
Figure 4:
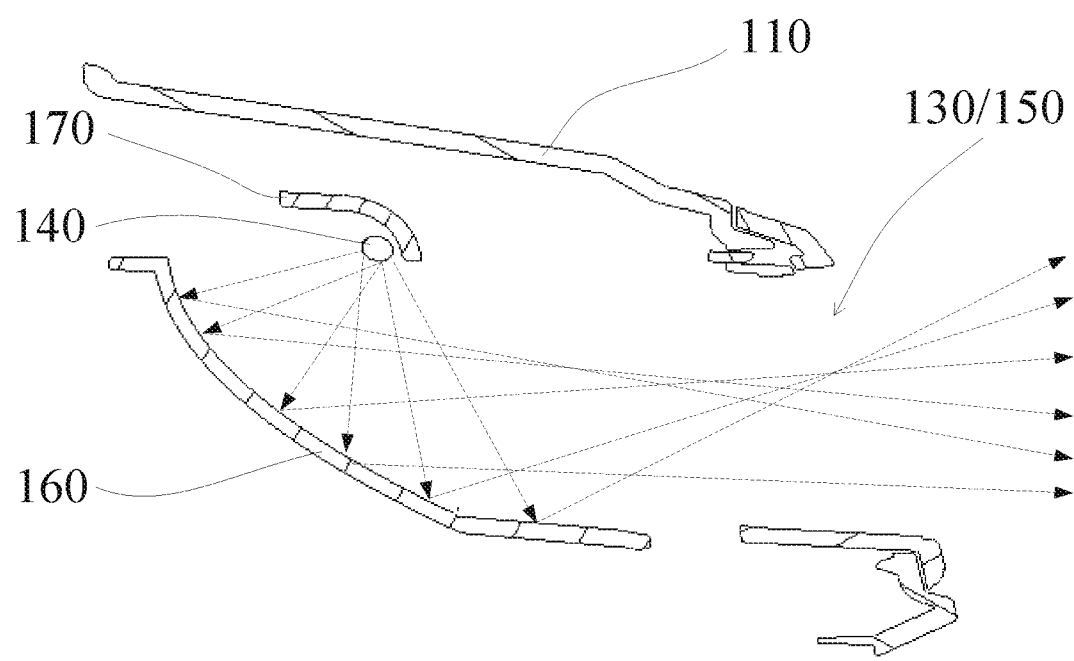
FIG. 4 is a cross sectional view taken along a line A-A' shown in FIG. 1, schematically showing an arrangement and a light path of a lighting or signaling device according to an exemplary embodiment of the present disclosure.

The light guide member 140 may be positioned and configured to guide a part of the light from the first light source 101 to exit directly from the second light exit region 130 and/or the third light exit region 150. Alternatively, as shown in FIGS. 3, 4 and 5, the lighting or signaling device 100 may further comprise a first optical element 160 positioned and configured to guide the light from the second light source 102 towards the second light exit region 130 and/or the third light exit region 150 to exit therefrom. The first optical element 160 may be any appropriate element having a light guiding function, including but not limited to a reflective bowl, a reflector, a lens, a light condenser, a collimator, a light guide element or the like. In this case, the light guide member 140 may be positioned and configured to guide a part of the light from the first light source 101 to the first optical element 160, such that a part of the light from the first light source 101 is guided by the first optical element 160 to exit from the second light exit region 130 and/or the third light exit region 150. As such, the light guide member 140 may be prevented from being directly viewed from the exterior of the lighting or signaling device, improving aesthetic appearance. The first optical element and the second light source may be members of existing or available vehicle light (e.g., a high beam light, a low beam light or the like).

The light guide member 140 may be positioned inside the housing 110 such that it is invisible when being viewed from the exterior of the lighting or signaling device 100 in a direction opposite to a light exiting direction, thereby obtaining a better aesthetic appearance. In some embodiments of the present disclosure, as shown in FIGS. 3, 4 and 5, the lighting or signaling device 100 further comprises a light shielding member 170 positioned to shield the light guide member 140 from being directly viewed from the exterior of the lighting or signaling device in the direction opposite to the light exiting direction, but the light shielding member 170 will not affect or shield the light from the light guide member 140 from being emitted towards the second light exit region 130, the third light exit region 150 and/or the first optical element 160. Exemplarily, the light shielding member 170 shields parts of the light from the light guide member 140, which are not emitted towards the second light exit region 130, the third light exit region 150 and/or the first optical element 160, from being emitted outwardly, thereby preventing the light guide member from being viewed by an external viewer. The light shielding member 170 may also shield a non-light exit portion of the light guide member 140. The light shielding member 170 may be fixed or mounted on the housing 110. In FIGS. 1 and 2, in order to schematically show the light guide member 140, a portion of the housing 110, the light shielding member 170 and other members are removed.

Also, as shown in FIG. 3, the lighting or signaling device 100 may further be provided with a second optical element 180, which is configured to guide the light from the light source 101 towards the first light exit region 120 to exit. The second optical element 180 may be also any appropriate element having a light guiding function, including but not limited to a reflective bowl, a reflector, a lens, a light condenser, a collimator, a light guide element or the like. It will be understood that the second optical element 180 and the first light source 101 may be also members of existing or available vehicle lights (e.g., a daytime running light, a position light or the like).

In some examples, the first light source 101 and/or the second light source 102 may comprise one or more LED light source, which may be arranged on corresponding PCB boards 103, 104, as shown in FIGS. 3 and 6.

Further, in other embodiments, although not shown, except or in addition to the first light source, the lighting or signaling device or the motor vehicle may be additionally provided with auxiliary light source(s), from which light may be guided by the above-described light guide member or other appropriate light guiding element so as to be emitted towards other light exit region(s), other than the first light exit region, of the lighting or signaling device, for example, towards the second and/or the third light exit region as described above. The auxiliary light source(s) is/are preferably capable of generating light having the same effect (e.g., intensity, luminance or the like) as the above-described first light source. The auxiliary light source(s) may be selectively powered so as to be lit; for example, when the first light exit region is lit to achieve a first light emitting effect (e.g., a daytime running light effect, a position light effect, or the like) and the first light emitting effect or other light emitting effect similar thereto needs to be strengthened, the above-described or other appropriate light guiding element may be used to guide light from the auxiliary light source(s) to be emitted towards other light exit region(s), such as the above second and/or third light exit region, such that the first light emitting effect or other light emitting effect similar thereto is also achieved in the other light exit region(s), thereby increasing the effective light exit area, improving the visual effect, and providing a redundant function if the light source of the daytime running light, the position light or the like fails.

An embodiment of the present disclosure further provides a motor vehicle comprising the lighting or signaling device described in any of the embodiments of the embodiments.

Although the present disclosure has been described with reference to the accompanying drawings, the embodiments disclosed in the accompanying drawings are intended to illustrate the preferred embodiment of the disclosure and should not be construed as being limitative to the disclosure. Scales in the figures are only illustrative and should not be construed as being limitative to the disclosure.

Although some embodiments of the general concept of the disclosure have been described and illustrated with reference to the accompanying drawings, it would be appreciated by those ordinary skilled in the art that various changes or modifications may be made to these embodiments without departing from principle and spirit the disclosure. The scope of the present invention is solely defined by the appended claims and their equivalents.

The invention claimed is:

1. A lighting or signaling device, comprising:
   a first light source provided within a housing, the housing defining at least a first light exit region and a second light exit region independent of each other, a first part of light from the first light source exiting the housing as a first light beam from the first light exit region;
   a light guide member provided in the housing and assigned to the first light source, wherein the light guide member is positioned and configured to guide a second part of the light from the first light source to exit through at least the second light exit region of the housing, and the light guide member includes a light pipe configured to confine the second part of light and transport the second part of light along a longitudinal direction of the light guide member; and
   a light shielding member positioned to shield the light guide member from being directly viewed from the exterior of the lighting or signaling device by blocking a straight optical path from the light guide member to the second light exit region,
   wherein the light guide member is positioned inside the housing such that the light guide member is not visible when being viewed through the second light exit region from the exterior of the lighting or signaling device in a direction opposite to a light exiting direction.

2. The lighting or signaling device according to claim 1, further comprising a second light source, from which light is guided to exit as a second light beam, which is different from the first light beam, from the second light exit region.

3. The lighting or signaling device according to claim 2, further comprising a first optical element positioned and configured to guide the light from the second light source to exit from the second light exit region.

4. The lighting or signaling device according to claim 2, wherein the second light beam includes at least one of a low light beam and a high light beam for a motor vehicle.

5. The lighting or signaling device according to claim 2, wherein the first light source is a light source for a daytime running light or a position light of a motor vehicle.

6. A motor vehicle, comprising the lighting or signaling device according to claim 2.

7. The lighting or signaling device according to claim 1, wherein, the light guide member extends from the first light exit region to a position adjacent to the second light exit region so as to guide the light from the first light source towards the second light exit region.

8. The lighting or signaling device according to claim 1, wherein the first light exit region and the second light exit region are arranged adjacent to each other.

9. The lighting or signaling device according to claim 1, wherein, the housing further defines a third light exit region configured to emit a third light beam different from the first light beam,
   wherein the second light exit region and the third light exit region are arranged adjacent to each other, or the first light exit region is positioned between the second light exit region and the third light exit region, and
   wherein the light guide member is further configured to guide the second part of the light from the first light source to exit through the third light exit region.

10. The lighting or signaling device according to claim 1, wherein, the first light exit region comprises a first light exit sub-region and a second light exit sub-region arranged adjacent to each other.

11. The lighting or signaling device according to claim 1, wherein the first light source is a light source for a daytime running light or a position light of a motor vehicle.

12. A motor vehicle, comprising the lighting or signaling device according to claim 1.

13. The lighting or signaling device according to claim 1, wherein:
the light guide member partitions at least one of the first light exit region and the second light exit region into sub-regions, and
the light guide member is positioned below at least one of the first light exit region and the second light exit region.

14. The lighting or signaling device according to claim 1, wherein the first part of light exits the housing from the first light exit region without being guided by the light guide member.

15. The lighting or signaling device according to claim 1, further comprising a reflector that is positioned and configured to receive the second part of the light from the light guide member so as to reflect the second part of the light out of the second light exit region.

16. A lighting or signaling device comprising:
a first light source provided within a housing, the housing defining at least a first light exit region and a second light exit region independent of each other, a first part of light from the first light source exiting the housing as a first light beam from the first light exit region;
a light guide member provided in the housing and assigned to the first light source, wherein the light guide member is positioned and configured to guide a second part of the light from the first light source to exit through at least the second light exit region of the housing, and the light guide member includes a light pipe configured to confine the second part of light and transport the second part of light along a longitudinal direction of the light guide member;
a light shielding member positioned to shield the light guide member from being directly viewed from the exterior of the lighting or signaling device by blocking a straight optical path from the light guide member to the second light exit region;
a second light source, from which light is guided to exit as a second light beam, which is different from the first light beam, from the second light exit region; and
a first optical element positioned and configured to guide the light from the second light source to exit from the second light exit region,
wherein the light guide member is positioned below the first optical element that is positioned below the second light source and configured to guide the second part of the light from the first light source to the first optical element, such that the second part of the light from the first light source is guided by the first optical element to exit from the second light exit region.

17. A lighting or signaling device comprising:
a first light source provided within a housing, the housing defining at least a first light exit region and a second light exit region independent of each other, a first part of light from the first light source exiting the housing as a first light beam from the first light exit region;
a light guide member provided in the housing and assigned to the first light source, wherein the light guide member is positioned and configured to guide a second part of the light from the first light source to exit through at least the second light exit region of the housing, and the light guide member includes a light pipe configured to confine the second part of light and transport the second part of light along a longitudinal direction of the light guide member;
a light shielding member positioned to shield the light guide member from being directly viewed from the exterior of the lighting or signaling device by blocking a straight optical path from the light guide member to the second light exit region;
a second light source provided within the housing, from which light is guided to exit as a second light beam, which is different from the first light beam, from the second light exit region; and
a reflector positioned and configured to guide the light from the second light source to exit from the second light exit region,
wherein the light guide member is positioned below the reflector that is positioned below the second light source and configured to guide the second part of the light from the first light source to the reflector, such that the second part of the light from the first light source is guided by the reflector to exit from the second light exit region.

* * * * *